(12) United States Patent
Hulick

(10) Patent No.: US 12,505,127 B2
(45) Date of Patent: Dec. 23, 2025

(54) CLOUD-BASED MULTI-USER MINDMAP GENERATION ENGINE AND INTEGRATED CUSTOMER RELATIONS MANAGEMENT DATABASE PLATFORM

(71) Applicant: Thomas Hulick, Pasadena, CA (US)

(72) Inventor: Thomas Hulick, Pasadena, CA (US)

( * ) Notice: Subject to any disclaimer, the term of this patent is extended or adjusted under 35 U.S.C. 154(b) by 0 days.

(21) Appl. No.: 18/936,825

(22) Filed: Nov. 4, 2024

(65) Prior Publication Data

US 2025/0147984 A1 May 8, 2025

Related U.S. Application Data

(60) Provisional application No. 63/547,120, filed on Nov. 2, 2023.

(51) Int. Cl.
*G06F 16/00* (2019.01)
*G06F 16/28* (2019.01)
*G06Q 30/01* (2023.01)

(52) U.S. Cl.
CPC .......... *G06F 16/285* (2019.01); *G06Q 30/01* (2013.01)

(58) Field of Classification Search
CPC ............................ G06F 16/285; G06Q 30/01

USPC .......................................................... 707/802
See application file for complete search history.

(56) References Cited

U.S. PATENT DOCUMENTS

| | | | |
|---|---|---|---|
| 12,259,807 B2* | 3/2025 | Xie | G06F 11/3684 707/707 |
| 2022/0091716 A1* | 3/2022 | Kocmanek | G06F 3/0486 707/707 |
| 2023/0004582 A1* | 1/2023 | Barrett | G06F 16/903 707/707 |

* cited by examiner

*Primary Examiner* — Alexandria Y Bromell

(57) ABSTRACT

A generative artificial-intelligence augmented mindmap chart engine and customer relations management database platform includes an customer relations management database module, and a mindmap generation engine including a discovery module, a generative artificial intelligence interface module configured to communicate with one or more generative artificial-intelligence models using one or more application programming interfaces, a retrieval-augmented generation database module, a mindmap database configured to store one or more mindmap charts and one or more metadata tags associated with the one or more mindmap charts, and an updater module configured to initiate a mindmap chart update sequence.

20 Claims, 6 Drawing Sheets

CLOUD-BASED MULTI-USER MINDMAP GENERATION ENGINE AND INTEGRATED CUSTOMER RELATIONS MANAGEMENT DATABASE PLATFORM

CROSS REFERENCE TO RELATED APPLICATION

This application claims the benefit of U.S. Provisional Application Ser. No. 63/547,120, filed Nov. 2, 2023, the entirety of which is incorporated by reference herein.

BACKGROUND OF THE INVENTION

Technical Field

Aspects of embodiments of the present disclosure are directed to multi-user mindmap chart generation systems having generative artificial intelligence (hereinafter "AI" or "Gen-AI") models integrated within a customer relations management platform. More specifically, aspects of embodiments of the present disclosure are directed to an mindmap generation engine configured to synthesize and prepare customizable mindmap charts based on processed audio recordings and/or transcripts.

Problems That are to be Solved by the Invention

The use of mindmap charts may provide improved accuracy and efficiency for providing information to one or more users within a system, e.g., members of a sales or client management team. However, it can be a time-consuming and difficult process to create a mindmap for a user and to keep the mindmap up to date. These problems become increasingly overwhelming as the number of users and mindmap charts grows. For example, within even a small business, the time required to generate and update mindmap charts for a relatively small number of clients for even a few sales team employees may be sufficiently large to prevent the adoption of mindmap charts within the business. Therefore, there is a need for a system that can increase the speed and efficiency of mindmap generation and customization to better suit the needs of larger teams/businesses.

Means for Solving the Problem

Aspects of embodiments of the present disclosure may be directed to multi-user mindmap chart platforms incorporating generative AI systems that may produce mindmap charts that may be configured within and/or integrated with a customer relations management database. Some embodiments of the present disclosure may thus leverage generative AI processes within a mindmap generation engine that may be configured to interface with one or more customer relations management database profiles within a customer relations management database to automate aspects of the mindmap creation, customization, and updating processes.

Effect of the Invention

Some embodiments of the present disclosure may provide a mindmap generation engine that leverages generative AI models to produce, customize, and update mindmap charts based on information recorded in a CRM database, or provided by a user, in a faster, more scalable process than has before been possible. Moreover, some embodiments of the present disclosure may provide new workflow processes involving mindmap charts that were previously unfeasible due to the time-consuming nature of mindmap chart generation.

SUMMARY OF THE INVENTION

One or more embodiments of the present disclosure may be directed to a generative artificial-intelligence augmented mindmap chart engine and customer relations management database platform A generative artificial-intelligence augmented mindmap chart engine and customer relations management database platform includes an customer relations management database module having a user database configured to store one or more user profiles, and a subject database configured to store one or more subject profiles, and a mindmap generation engine including a discovery module configured to initiate a discovery session and present one or more discovery questions, receive new subject data, and store subject data in one or more subject profiles, a generative artificial-intelligence interface module configured to communicate with one or more generative artificial-intelligence models using one or more application programming interfaces, a retrieval-augmented generation database module configured to store one or more mindmap chart generation/update prompt templates and append subject data from the one or more subject profiles, user data from the one or more user profiles, and one or more mindmap charts to the one or more mindmap chart generation/update prompt template to create one or more mindmap chart generation/update prompts, a mindmap database configured to store the one or more mindmap charts and one or more metadata tags associated with the one or more mindmap charts, and an updater module configured to initiate a mindmap chart update sequence.

The generative artificial-intelligence augmented mindmap chart engine and customer relations management database platform may have the user profiles be configured with a user metadata tag, the subject profiles be configured with a subject metadata tag, and the mindmap charts be configured with a mindmap chart metadata tag.

The generative artificial intelligence augmented mindmap chart engine and customer relations management database platform may have the discovery session be a conducted using an automated chatbot.

The generative artificial-intelligence augmented mindmap chart engine and customer relations management database platform may have the generative artificial-intelligence model be an external large language model (LLM) generative AI platform.

The generative artificial-intelligence augmented mindmap chart engine and customer relations management database platform may have the update sequence be initiated in response to a subject profile being updated by a user.

The generative artificial-intelligence augmented mindmap chart engine and customer relations management database platform may have the updater module be configured to increment a mindmap chart version metadata tag in response to completing an update sequence.

A multi-user generative artificial-intelligence augmented mindmap chart engine and customer relations management database platform includes an customer relations management database module having a user database configured to store one or more user profiles, each user profile having a unique user metadata tag, and a subject database configured to store one or more subject profiles, each subject profile having a unique subject metadata tag, and a mindmap generation engine including a discovery module configured to initiate a discovery session and present one or more discovery questions, receive new subject data, and store subject data in one or more subject profiles, a generative artificial-intelligence interface module configured to communicate with one or more generative artificial-intelligence models using one or more application programming interfaces, a retrieval-augmented generation database module configured to store one or more mindmap generation/update prompt templates and append subject data from the one or more subject profiles, user data from the one or more user profiles, and one or more mindmap charts to the one or more mindmap generation/update prompt template to create one or more mindmap chart generation/update prompts, a mindmap database configured to store the one or more mindmap charts, each mindmap chart having an associated mindmap chart version tag, and one or more mindmap chart metadata tags associated with the one or more mindmap charts, and an updater module configured to initiate mindmap chart update sequences.

The multi-user generative artificial-intelligence augmented mindmap chart engine and customer relations management database platform may have the user database, the subject database, and the mindmap database include relational database structures.

The multi-user generative artificial-intelligence augmented mindmap chart engine and customer relations management database platform may have at least one of the one or more generative artificial-intelligence models be an internal generative artificial-intelligence model integrated within the platform.

The multi-user generative artificial-intelligence augmented mindmap chart engine and customer relations management database platform may have at least one of the one or more generative artificial-intelligence models be an external generative artificial-intelligence model hosted remotely.

The multi-user generative artificial-intelligence augmented mindmap chart engine and customer relations management database platform may have the user data from the one or more user profiles includes a user preference that designates a prioritization for one or more categories of subject data to be displayed within a generated mindmap chart.

The multi-user generative artificial-intelligence augmented mindmap chart engine and customer relations management database platform may have a mindmap chart generated by the platform include the user metadata tag, the subject metadata tag, and the associated mindmap chart version tag.

The multi-user generative artificial-intelligence augmented mindmap chart engine and customer relations management database platform may have the operator database module and the mindmap database be configured to associate the mindmap chart generated by the platform with user profile corresponding to the user metadata tag and the subject profile corresponding to the subject metadata tag.

A cloud-based multi-user generative artificial-intelligence augmented mindmap chart engine and customer relations management database platform includes a host including computer-readable instructions stored in a memory that, when executed by one or more processing units of one or more cloud servers, instantiate one or more software modules of the platform, the one or more modules of the platform including a customer relations management database module including a user database configured to store one or more user records, and a subject database configured to store one or more subject records, and a mindmap generation engine including a discovery module configured to initiate a discovery session and present one or more discovery questions, receive new subject data, and store subject data in one or more subject records, a generative artificial-intelligence interface module configured to communicate with one or more generative artificial-intelligence models using one or more application programming interfaces, a retrieval-augmented generation database module configured to store one or more mindmap generation/update prompt templates and append subject data from the one or more subject records, user data from the one or more user records, and one or more mindmap charts to the one or more mindmap generation/update prompt template to create one or more mindmap chart generation/update prompts, a mindmap database configured to store the one or more mindmap charts and one or more metadata tags associated with the one or more mindmap charts, and an updater module configured to initiate mindmap chart update sequences.

The cloud-based multi-user generative artificial-intelligence augmented mindmap chart engine and customer relations management database platform may have the user database, the subject database, and the mindmap database include relational database structures.

The cloud-based multi-user generative artificial-intelligence augmented mindmap chart engine and customer relations management database platform may have at least one of the one or more generative artificial-intelligence models be an external generative artificial-intelligence model hosted remotely.

The cloud-based multi-user generative artificial-intelligence augmented mindmap chart engine and customer relations management database platform may have the user data from the one or more user profiles includes a user preference that designates a prioritization for one or more categories of subject data to be displayed within a generated mindmap chart.

The cloud-based multi-user generative artificial-intelligence augmented mindmap chart engine and customer relations management database platform may have the user data from the one or more user profiles is for each user profile whereby each user profile when associated with a mindmap chart generation/update request will generate a mindmap chart specific to the user preferences included in the associated user profile.

The cloud-based multi-user generative artificial-intelligence augmented mindmap chart engine and customer relations management database platform may have each mindmap chart generated by the platform have an associated mindmap chart version tag.

The cloud-based multi-user generative artificial-intelligence augmented mindmap chart engine and customer relations management database platform may have the mindmap database be configured to allow for tracking the changes over time made to mindmap charts stored in the mindmap database according to the mindmap chart version tag.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
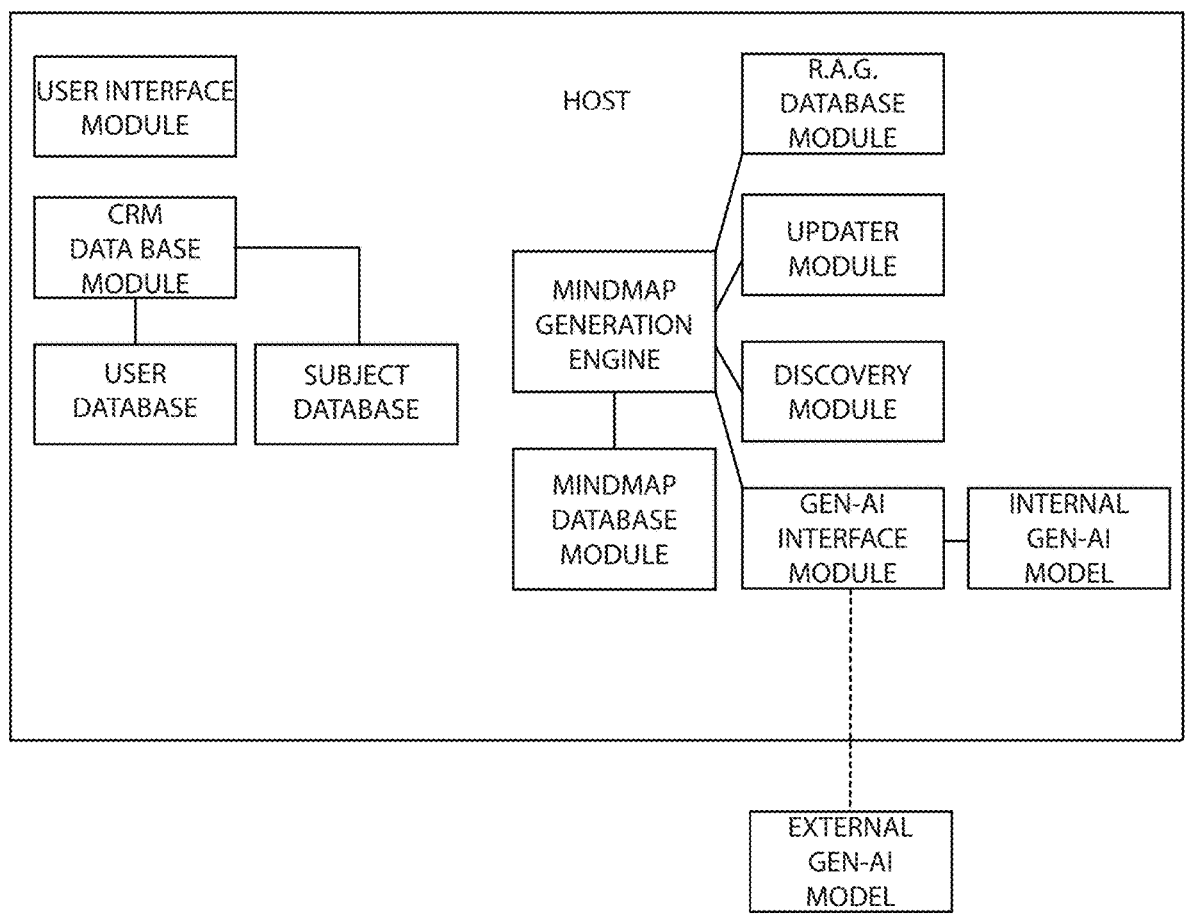
FIG. 1 is a diagram of a mindmap generative artificial intelligence engine and customer relations management database platform, according to aspects of embodiments of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Definitions

Customer Relations Management (CRM): a database platform that allow for recording, tracking, and updating client information.

Application Programming Interface (API): an Application Programming Interface (API) defines a set of protocols and tools for building software applications; it specifies how different software components should interact, allowing them to communicate and share data.

Generative Artificial Intelligence (Gen-AI): a type of artificial intelligence configured to generate textual, visual, audio, or audiovisual content in response to one or more prompts.

Large Language Model (LLM): a type of AI using a large compendium of textual training data within a neural network, often a recurrent neural network (RNN), to perform natural language understanding and generative tasks in response to prompts received from a user.

Retrieval-Augmented Generation (RAG): a technique for providing a generative AI model a prompt that combines instructions and contextualizing information alongside the generation request to improve the quality of the generated content and prevent errors.

Mindmap Chart: a type of organization chart that groups concepts into nodes and shows the relation between data points and nodes using lines. These types of charts are often intended to follow a structure based on user preferences to facilitate easier use.

Versioning: the recording of an ordered sequence of version tags for a data record or mindmap chart that represents that changes made over time.

Metadata tag: a data entry, sometimes alphanumeric data, stored within a data record that contains information about the data record.

Present State-of-the-Art

Some of the most popular software products for businesses are customer relations management (CRM) platforms that allow for recording, tracking, and updating client information in a database structure. These types of CRM products help businesses to organize and utilize client data to track interactions, invoices, communication preferences, etc. to increase efficiency and drive more effective interactions with clients. In many instances, a client profile will be developed during the business's onboarding process to obtain information from the client about who they are and what they do. Some of these profiles will also include information about the client's communication preferences and/or interests. For example, a new client might prefer email communication over phone calls and he or she may have an interest in growing the interstate reach of his or her business. This information may then be utilized to customize communications with the client and target them for goods or services that might help to expand the market presence of the client's business.

A mindmap is a type of organizational chart that clusters different information together about one or more core concepts (referred to as "nodes"). The structure of a mindmap is intended to help organize and present information to a user in a structure that assists the user in quickly identifying information he or she wants in a form that follows the user's mental processes. Hence the name, "mindmap." Creating a mindmap can often be a time-consuming process requiring both extensive questioning of the user/client to "discover" his or her information necessary for the completion of a mindmap chart and customization of the mindmap to reflect the organizational preferences of the user. Moreover, the processes/preferences of the user may change over time, and the structure of their mindmap(s) may require updates when new information is obtained that shifts/alters the processes/preferences of the user.

Generative artificial intelligence (AI) is an emerging application within the AI/machine learning field that allows for an AI system to use a language model to process prompts and generate text, image, sound, and/or video responses based on the prompt. For example, a prompt might ask a generative AI to provide them with a summary of a news article, and the generative AI may process the text of the article to interpret the message of the article and the information it contains and then generate a summary of the most prominent information presented within the article. Many of the most popular generative AI systems currently available are large language model (LLM) systems. One common issue with these LLM systems is their tendency to produce false information based on what the system believes the user is looking for in the prompt. For example, an LLM might return a summary of several holdings from different judgments when prompted for answers to a legal question, but the cases may not be real. Rather, the LLM may generate false cases based on its interpretation of existing case holdings to generate an answer to the user's question. This type of error is often referred to as "hallucination" and many developing generative AI techniques, such as prompt engineering and retrieval-augmented generation (RAG), involves strategies and methods to help prevent LLM systems from generating hallucinated responses and for customizing the output of the generative AI system to meet specific user needs.

Cloud-Based Mindmap Generative Artificial Intelligence Engine and Customer Relations Management Database Platform As described above, aspects of embodiments of the present disclosure are directed to generative AI systems that are configured to produce mindmap charts and that may be configured within or integrated with a customer relations management platform. The embodiments of these systems may be implemented as software modules written in one or more programming languages and executed on one or more computing devices. Some embodiments of the present disclosure may be executed by one or more processing units of a server connected to a network. As will be understood by one skilled in the art, the computing devices and/or servers executing code to instantiate the software modules described herein may be any suitable computing device as would be known to be suitable for this purpose. Similarly, the various embodiments of the software modules described herein may be programmed in any computing/programming language known to be suitable for this purpose. This may include, but is not limited to C, Python, React, Rust, Ruby, Perl, HMTL, Java, JavaScript, Swift, SQL, and any other programming languages known to be suitable for web development, application development, database management, machine learning and/or artificial intelligence applications.

I. Multi-User Generative Artificial-Intelligence Augmented Mindmap Chart Engine and Operator Database Platform One or more embodiments according to the present disclosure will now be described. As described previously, some embodiments of the present disclosure may be multi-user generative artificial-intelligence augmented mindmap chart generation engine and relational database platforms. In some embodiments, the various modules of these embodiments may be run within or otherwise integrated into a host. The host may, in some embodiments, be an application run by a server, cloud server, or other computing device configured to provide web services to one or more remote clients over a network. As will be appreciated by one skilled in the art, the host may be run on any computing device known to be suitable for this purpose. This may include computing devices having one or more processing units, graphics processing units (GPUs), memory, storage, and other hardware that facilitates networked communication. In some embodiments, these computing devices may be desktop computers, servers, and network and/or cloud servers. In some embodiments the host may be instantiated in a cloud environment, where computing resources from one or more cloud servers may be provisioned to run the host and it component functions.

In some embodiments, the host may include one or more software modules (hereinafter, "modules") that carry out different functions/operations. The organization and function of these modules is detailed below, and further understanding of the organization of the component software modules may be had by reference to FIG. 1.

FIG. 1 is a diagram of a mindmap generative artificial intelligence engine and customer relations management database platform, according to aspects of embodiments of the present disclosure. As depicted, in some embodiments, the platform of the present disclosure may include one or more component software modules. In some such embodiments, the one or more component software modules may be organized and run within the host. In some embodiments, the component software modules may include one or more sub-modules. A detailed description of some of the component software modules and associated sub-modules is presented following subsections.

Figure 2:
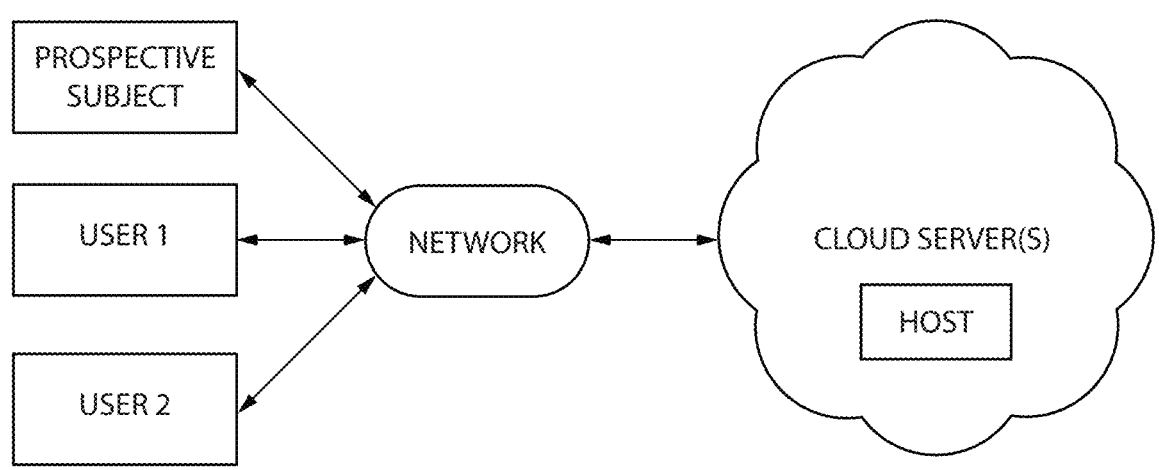
FIG. 2 is a diagram of a prospective subject and two users communicating with a cloud-based host, according to aspects of embodiments of the present disclosure.

Some embodiments of the present disclosure may be cloud-based embodiments, i.e., embodiments where the host and its associated modules are instantiated on one or more cloud servers and accessed by one or more users and, in some embodiments, one or more prospective subjects using a network. Further understanding of such embodiments may be had by reference to FIG. 2. FIG. 2 is a diagram of a prospective subject and two users communicating with a cloud-based host, according to aspects of embodiments of the present disclosure.

Aspects of embodiments of the various software modules contained within embodiments of the host will now be described.

A. Customer Relations Management Database Module

As defined above, a customer relations management platform allows for recording, tracking, and updating client information in a database structure that associates users and subjects (i.e., customers). Customer relations management platforms help businesses to organize and utilize client data to track interactions, invoices, communication preferences, etc. to increase efficiency and drive more effective interactions with clients.

Generally, a customer relations management platform is operated by two types of "operators." The term "operator" may be used herein to refer to a person that inputs data into one or more embodiments of the platform of the present disclosure. As used herein, there may be two general types of operators: users; and subjects. Users may, in some embodiments, be persons who input data and request data, such as mindmap charts, from the platform of the present disclosure. Subjects may, in some embodiments, be person about whom the platform records data and generates mindmap charts based upon that data. As a non-limiting example, users may be one or more members of a sales team within a company, and the subjects may be one or more clients and/or potential clients.

In some embodiments, the platform of the present disclosure may include a customer relations management database module. The customer relations management database module may, in some embodiments, include one or more databases and carry out the processing of input/output and save/recall functions for those databases. As will be appreciated by one skilled in the art, there are a wide variety of database structures that may be used within the scope of the present disclosure. As non-limiting examples, this may include databases structures that are relational databases that use SQL and other so-called NoSQL database structures. Examples of such NoSQL database structures may include document databases, key-value databases, wide-column stores databases, and graph databases. In some embodiments, the customer relations management database module may be configured to organize and carry out input/output and store/recall operations across more than one database structure type.

i. User Database

As described above, users may be one or more persons that access the platform of the present disclosure and request/use one or more mindmap charts generated by the platform. In some embodiments, each user may have a unique profile. In some other embodiments, each user may have a unique user record. In still other embodiments, each user may have a unique user metadata tag.

In some embodiments, the user database may store user data associated with one or more users, respectively. In some embodiments, this user data may include, but is not limited to, access permissions, access logs, passwords, documents, and/or user preferences. User preferences may, in some embodiments, include preferences, prioritization values, and/or weighting values that may be used by the platform when generating a mindmap chart according to the preferences of a user.

As discussed above, the user database may use any structure as would be known by one skilled in the art to be suitable for this purpose. This may include, but is not limited to, relational/SQL and NoSQL database structures. For some embodiments that use a relational database structure, individual entries for one or more users may be referred to as user records. For other database structures, as will be appreciated by one skilled in the art, the terminology used for the individual entries may vary.

In some embodiments, including relational and NoSQL database embodiments, the individual users may have a unique user metadata tag stored within the user database and that may be used within the platform to associate other data recorded in other databases with one or more users.

ii. Subject Database

As described above, in some embodiments, subjects may be one or more persons that input data into the system and/or have input about them input into the platform to have one or more mindmap charts generated by the platform. In some embodiments, each subject may have a subject profile. In some other embodiments, each subject may have a unique subject record. In still other embodiments, each subject may have a unique subject metadata tag.

In some embodiments, the subject database may store subject data associated with one or more subjects, respectively. In some embodiments, this subject data may include, but is not limited to, data acquired through a discovery process that may include one or more questions about the subject's life, career, goals, property, employments, and other topics.

As discussed above, the subject database may use any structure as would be known by one skilled in the art to be suitable for this purpose. This may include, but is not limited to, relational/SQL and NoSQL database structures. For some embodiments that use a relational database structure, individual entries for one or more subjects may be referred to as subject records. For other database structures, as will be appreciated by one skilled in the art, the terminology used for the individual entries may vary.

In some embodiments, including relational and NoSQL database embodiments, the individual subjects may have a unique subject metadata tag stored within the subject database and that may be used within the platform to associate other data recorded in other databases with one or more subjects.

B. Mindmap Generation Engine

Aspects of some embodiments of the present disclosure are directed to the generation of mindmap charts. In some embodiments, the mindmap charts may be generated by one or more generative AI models. In some embodiments, the mindmap charts may be generated using a retrieval-augmented generation process. In some embodiments, generated mindmap charts may be stored and updated within the platform to provide additional utility to the mindmap charts and to facilitate the customization of mindmap charts for one or more users according to their individual user preferences. Accordingly, in some embodiments, the mindmap generation engine of the present disclosure may include one or more modules/submodules. These are described in detail below.

i. Discovery Module

One of the first steps in creating a mindmap chart for a subject is to "discover" enough information about the subject, and the individual preference and mental processes of the subject, by presenting the subject with one or more questions to develop a subject profile. As used herein, the discovery process may be described as the presentation of one or more questions to a subject to obtain subject responses/data that can be recorded and structured to develop context for the subject profile and/or one or more generated mindmap charts. The discovery questions may include questions pertaining, but not limited to, a subject's job, experience, education, learning style, skillset, role or team position, prioritization pattern, and interpersonal relations.

One of the challenges in the discovery process is identifying gaps in the profile of a subject (or prospective subject) that require additional questions to be asked in order to develop a sufficient level of context for the subject or prospective subject. As such, in some embodiments, the discovery module may be configured to use one or more discovery prompts that may be combined with one or more collected subject/prospective subject responses and one or more previously presented discovery questions to compile a discovery analysis prompt that may be sent using one or more of the other modules of the present disclosure, such as the Generative Artificial-Intelligence Interface Module described below, to a generative AI or other machine-learning based system configurable by the discovery analysis prompt to return an analysis of the content of the one or more subject/prospective subject responses and identify aspects of the subject profile that require further development.

In some embodiments, the process of presenting discovery questions to a subject or prospective subject may be referred to as a discovery session or, alternatively, as a discovery sequence. In some embodiments, a discovery session may be conducted using a chatbot and a set of scripted discovery questions. As discussed above, in some embodiments, the chatbot may utilize natural language processing and/or the use of generative AI models to communicate with a subject/prospective subject to develop further discovery data.

The discovery sessions may, in some embodiments, be carried out by the discovery module in iterative steps until a sufficiently detailed subject profile has been developed. By incorporating an automated, AI-driven, discovery process, some embodiments of the discovery module may provide increases in speed, consistency, and adaptability that have never been possible before. Moreover, in some embodiments, because the AI-driven iterative discovery process can be carried out quickly and without requiring human supervision, new workflow possibilities for regularly updating and modifying subject/prospective subject data (i.e., generated mindmap charts) are possible that enable the creation of improved mindmap charts that reflect regularly updated subject data.

In some embodiments, parsed collected subject data may be structured into one or more JSON files that may be used by the platform to provide the collected subject data in a format that allows for the generation of a mindmap chart.

Embodiments of a method for performing a discovery session are described in detail the Discovery session section.

ii. Generative Artificial-Intelligence Interface Module

Some aspects of embodiments of the present disclosure are directed to the use of generative AI systems to generate mindmap charts that had previously been overly time consuming to produce for widespread application. As described above, a generative AI system is one type of artificial intelligence implementation that can provide newly created content in response to a prompt from a user. A popular type of generative AI is a large language model (LLM) construct. There may be many different LLM constructs suitable for the purpose of mindmap generation, but generally these LLMs will be created using deep-learning recurrent neural networks (RNNs) and have undergone significant training and development to allow for natural language understanding and reliable response generation. Some LLMs may be configured to prepare only textual responses, while others may be configured to prepare charts and tables. For the purpose of the present disclosure, any suitable generative AI model, including but not limited to LLMs and other generative AI models that use, for example, stable diffusion and other learning techniques, are within the scope of the present disclosure.

To facilitate communication with such generative AI models, some embodiments of the present disclosure may include a generative artificial-intelligence interface module The generative artificial-intelligence interface module may, in some embodiments, include one or more application programming interfaces (APIs) to structure back-and-forth communication with one or more generative AI models using one or more standardized calls. As will be appreciated by one skilled in the art, there are a variety of APIs that may be suitable for this purpose, and all of these as would be known to one skilled in the art are within the scope of the present disclosure.

Some embodiments of the present disclosure may include a generative artificial-intelligence interface module that may be configured to communicate with, e.g., send prompts to and receive generated content from, an "internal" generative AI model running within the system. Some such embodiments may thus have a generative artificial-intelligence interface module that may be configured to operate its own generative AI submodule (model) rather than interface with an external generative AI model. Such embodiments may use any generative AI model as would be known to one skilled in the art to be suitable for the purposes of the present disclosure.

There may be increased security and flexibility for such embodiments, as sensitive information does not have to be communicated to third parties outside of the platform. However, running a sufficiently powerful generative AI model, such as one of the currently available open-source LLMs like Llama 2, may require a significant amount of processing power. Moreover, to ensure responsive performance, some generative AI models require significant amount of graphics processing units (GPUs) configured to carry out operations in a massively parallel process. As such, for those embodiments having an "internal" generative AI submodule (model) operated integrated the system, any suitable computing device or combination of devices may be used to instantiate embodiments of the present disclosure, including, but not limited to, servers and/or server networks having one or more GPUs configured for parallel processing and AI applications.

iii. Retrieval-Augmented Generation Database Module

Retrieval-augmented generation (RAG) is a generative AI technique wherein a contextualizing prompt is provided alongside one or more resources to a generative AI model to restrict the generative AI model to certain types of responses and sources for drawing information from. The use of RAG may, for example, limit an otherwise general purpose generative AI model to only draw inferences from a collection of source data and to require specific confidence levels in the drawn inferences or restrict the response type to include only specific citation to data actually presented in the provided resources. This may, in some instances, help to produce specialized output from the generative AI model and reduce the tendency for the generative AI model to generate hallucinated responses or incorrect responses. In some contexts, this process is referred to as generative AI model customization.

Some embodiments of the present disclosure may include a retrieval-augmented generation (RAG) database module. The retrieval-augmented generation (RAG) database module may, in some embodiments, contain one or more pre-scripted prompts that may be sent to a generative AI system alongside user data and subject data collected by the discovery module and, in some embodiments, other data, including JSON files containing parsed subject data, to facilitate the RAG process of generating mindmap charts. The prompts may, in some embodiments, be structured to provide a specific role for the generative AI system and then instruct it on how to properly structure information into a mindmap chart organized by the user preferences provided in a user profile. In some other embodiments, one or more prompts may be structured to facilitate the processing and addition of contextualized information from one or more transcripts of discovery session into a new or an existing mindmap chart.

In some embodiments, the prompt text may be modified by appending user preference data to specify specific concepts, or "nodes," within the generated mindmap charts that are important and/or require a direct connection to the central "node." As a non-limiting example, when generating a mindmap chart that organizes information collected about a financial advising client, the central node may be specified in the user preferences as having to be the client's name. The user preferences may then further specify that client's occupation be listed in a node directly connected to the central node.

In some other embodiments, the user preferences may be associated with a user profile describing the organizational preferences of the user to allow for different mindmap charts to be created that provide an individualized or customized view of the data for different users. As a non-limiting example, in the context of a hospital, a mindmap chart generated for a doctor based on a patient's collected data may be organized differently and be generated from a doctor-specific prompt. A mindmap generated for the billing department may draw on the same collected patient (subject) information, or other information, but present a different organization of the nodes within the billing department mindmap chart to reflect the increased importance of information like insurance carried and home address of the patient. For some such embodiments, the user profile may be associated with a pre-scripted prompt including the user preferences and/or one or more instructions to the generative AI system to organize the generated mindmap charts at least in part based on the user preferences.

In some embodiments, the RAG database module may store one or more prompt templates that may have subject and/or user data appended to the one or more prompt templates to create a completed prompt. As a non-limiting example, in some embodiments there may be a mindmap chart generation/update prompt template that contains instructions and rules for a generative AI model to generate mindmap charts. In some embodiments the RAG database module may thus be configured to store one or more mindmap chart generation/update prompt templates and append subject data from the one or more subject records, user data from the one or more user records, and one or more mindmap charts to the one or more mindmap generation/update prompt template to create one or more mindmap chart generation/update prompts that may be sent to a generative AI model.

Some embodiments of a method for conducting a mindmap generation/update sequence are described in the Mindmap generation/update sequence section.

iv. Mindmap Database Module

Mindmap charts produced by the generative AI system in response to an RAG prompt compiled by the retrieval-augmented generation database module may, in some embodiments, be organized and stored within the system of the present disclosure to allow for use by one or more users. As such, some embodiments of the present disclosure may include a mindmap database configured to organize and store one or more generated mindmap charts. In some embodiments, the mindmap database module may include access restrictions to allow only authorized user profiles access to mindmap charts associated with their respective user profiles.

In some embodiments, the mindmap database module may be structured as a relational database, and stored mindmap charts may be associated with one or more user profiles and/or subject profiles within the customer relations management database. As such, in some embodiments, a user may be able to locate one or more subject records within the customer relations management database and then view one or more mindmap charts associated with that subject in the mindmap database module. In some other embodiments, the mindmap database may not be a relational database. Such embodiments may include, but are not limited to, the use of various NoSQL database structures as would be known to one skilled in the art to be suitable for this purpose. All such database structures as would be known to one skilled in the art to be suitable for this purpose are considered to be within the scope of the present disclosure. In some non-relational database embodiments, the association of users, subjects, and mindmap charts may be carried out by the use of user metadata tags, subject metadata tags, and mindmap chart metadata tags stored within and shared amongst the various data entries stored within the platform.

As will be appreciated by one skilled in the art, there are many suitable database structures that may be used within the scope of the present disclosure, and all such structures as would be known to be suitable for this purpose are considered within the scope of the present disclosure.

In some embodiments the mindmap database module may be configured to store the one or more mindmap charts and one or more metadata tags associated with the one or more mindmap charts.

Figure 3:
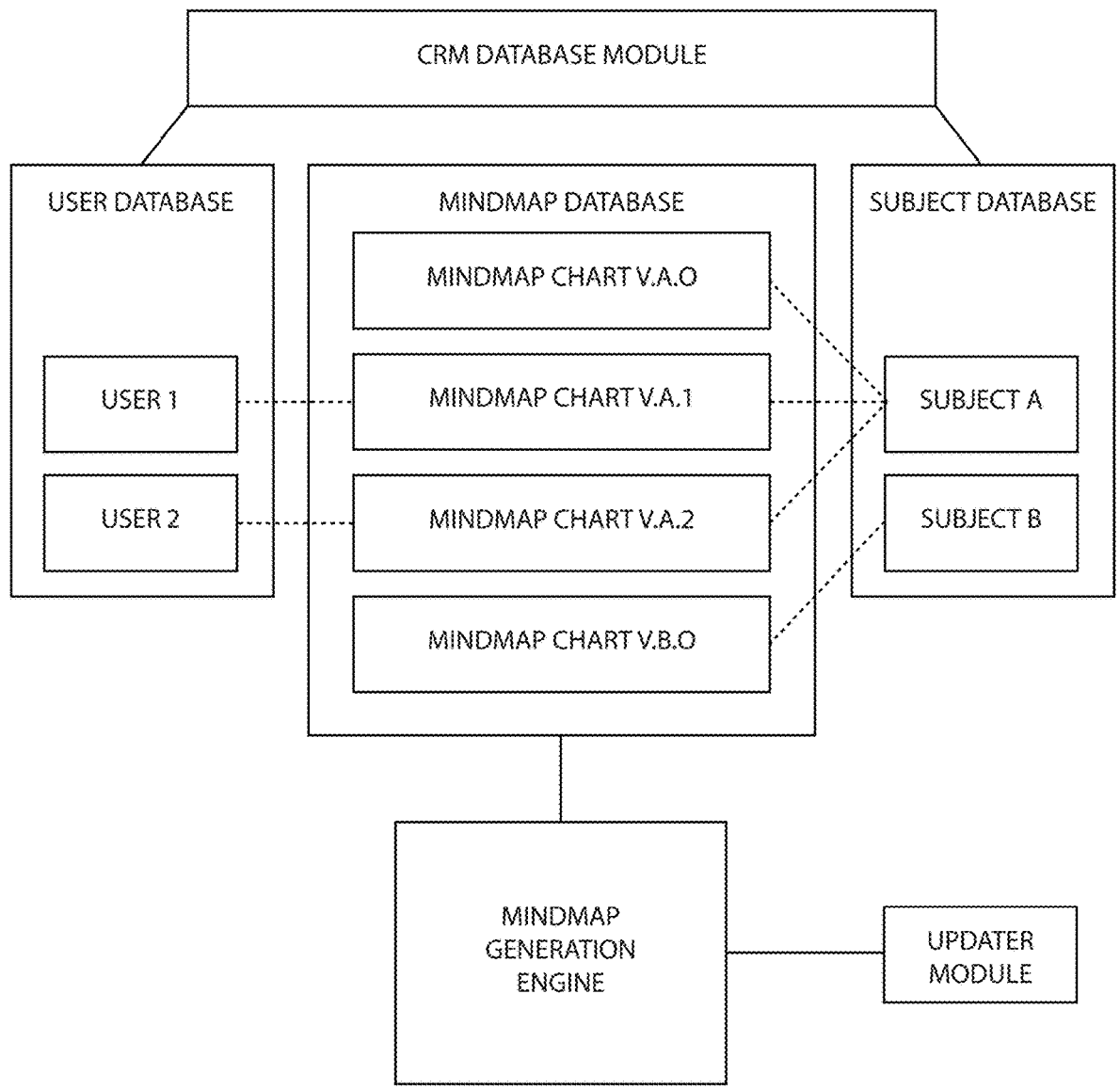
FIG. 3 is a diagram depicting the associations of user records and subject records to versioned mindmap charts within a mindmap database, according to aspects of embodiments of the present disclosure.

Further understanding of the association of users, subjects, and mindmap charts within some embodiments of the present disclosure may be had by reference to FIG. 3.

FIG. 3 is a diagram depicting the associations of user records and subject records to versioned mindmap charts within a mindmap database, according to aspects of embodiments of the present disclosure. FIG. 3 depicts a relational database embodiment; however, the present disclosure is not limited to such embodiments. Any distinctions between the relational database embodiments and those embodiments having a non-relational or NoSQL database structure will be understood by one skilled in the art.

Ad depicted in FIG. 3, a relation database module (a customer relations database module, in some embodiments) may, in some embodiments, include a user database and a subject database. The user database may, in some embodiments, contain one or more user profile (records). These are depicted as USER 1 and USER 2. Similarly, in some embodiments, the subject database may contain one or more subject profiles (records). These are depicted as SUBJECT A and SUBJECT B. In some embodiments, a mindmap database may contain one or more mindmap charts. In some embodiments, the mindmap charts may include one or more metadata tags. In some embodiments, these metadata tags may correspond to a version of the mindmap chart (denoted as "V"), a user metadata tag (denoted as a numeral), and a subject metadata tag (denoted as a letter). As will be appreciated by one skilled in the art, the metadata tags are denoted in FIG. 3 in a simplified form, and in some embodiments, the metadata tags may be strings of characters or include any other type of data that would be known to be suitable for the purpose of tagging digital files. The individual mindmap charts may, in some embodiments, be associated with a user and a subject. The association of users and/or subjects to a mindmap chart is shown by the dotted lines.

The mindmap database, as a component of some embodiments of the mindmap generation engine, is depicted as being connected to the updater module. As will be appreciated by one skilled in the art, in some embodiments, the mindmap charts stored in the mindmap database may be updated by the updater module. These updates may be tracked according to, in part, the metadata tags associated with the mindmap charts. The features of some embodiments of the updater module is described in detail below.

v. Updater Module

One of the benefits of a mindmap chart is that it can be updated and used to incorporate new information into a familiar structure. As a non-limiting example, a mindmap chart describing the information known about a customer may be updated as new information becomes available about the customer's business or personal life. Using the example of a financial planner again, the customer mindmap chart may require updates if the customer changes jobs or changes his or her marital status. As such, some embodiments of the present disclosure may include an updater module. The updater module may, in some embodiments, be configured to locate and update the one or more generated mindmap charts stored in the mindmap database. In some such embodiments, the updater module may be configured to locate and modify one or more JSON files associated with a subject profile or a user profile, or parsed subject response data, in response to new information being entered into the customer relations management database module. As a non-limiting example, a new recording of a subject conversation may be stored in the customer relations management database and associated with the subject profile in the customer relations management database. This may trigger the updater module to have the recorded conversation transcribed and processed (parsed) by the discovery module, have new information summarized from the transcript using an LLM, and then provide the new information alongside an mindmap chart generation/update prompt and the original JSON file containing the subject data to the generative AI model in order to return an updated mindmap chart for the subject.

In some embodiments, the functions of the updater module may be triggered based on one or more event handling scripts. In some other embodiments, the updater module may be configured to periodically conduct an automatic review of the CRM database and identify old mindmap charts in the mindmap database module that are due for updates according to one or more settings that may be set in the system for monitoring the time between updates to a mindmap chart. In still other embodiments, a combination of these two processes may be used.

In some embodiments, the updater module may be configured to keep a version history of the stored mindmap charts after each update. This may, in some embodiments, include a file describing the changes made to the JSON file over time. In some other embodiments, this may include storage of all of the prior versions of the mindmap charts. In some other embodiments, a version metadata tag associated with each version of a mindmap chart may be stored and incrementally updated by the updater module in response to a completed update sequence. The update sequence is described in greater detail in the Update sequence section.

In some embodiments, the updater module may be configured to alert one or more users when an update occurs. As a non-limiting example, if a member of a sales team (a user) has a conversation with a client (subject), and that conversation is recorded and triggers a mindmap update to the mindmap chart associated with the client, the updater module may send alerts to the other sales team members (other users) about the update. In some embodiments, these updates may include summarized or parsed information as produced by the discovery module that is used to update the JSON file associated with the mindmap chart of the client. In some other embodiments, these updates may include suggested actions or recommendations for the one or more recipients based on an analysis of the information contained in the update. These suggested actions may include, but are not limited to, follow-up calls, targeting for promotional materials, and referrals to other users.

In some embodiments, the updater module may be configured to utilize the retrieval-augmented generation database module and the generative artificial-intelligence interface module to prepare and send prompts to one or more generative AI models instructing the generative AI models to use a preexisting mindmap chart's JSON file as a base and to process and incorporate new information into the preexisting mindmap chart.

Thus, in some embodiments, the updater module may be configured to integrate with a mindmap database that is regularly or constantly monitored for updates in order to produce a coherent and up-to-date presentation of collected subject data. Additionally, the updater module may, in some embodiments, provide a versioned history of updates to mindmap charts within the mindmap database module that may be used to derive additional insights. Also, in some embodiments, the updater module may be configured to provide an analysis of updated mindmap charts and provide intelligent task alerts based on certain types of updates or other alerts to multiple users to keep entire teams of user current on developing client information. In some embodiments, the intelligent task alerts may include suggested follow-up actions, potential upselling opportunities, or reminders for critical client engagements.

In some embodiments, the updater module may be configured to allow for one or more users to insert feedback or comments into the JSON files of a mindmap chart for a client to ensure that pertinent insights from the users are included in the charts and/or included in the JSON file for future review.

Further description of some embodiments of the update sequence performed by some embodiments of the updater module is provided in the Update sequence section.

C. Discovery Session

As described above, in some embodiments, the discovery module may be configured to collect and store subject data by initiating a discovery session. Further understanding of embodiments of the discovery session may be had by reference to FIG. 4.

Figure 4:
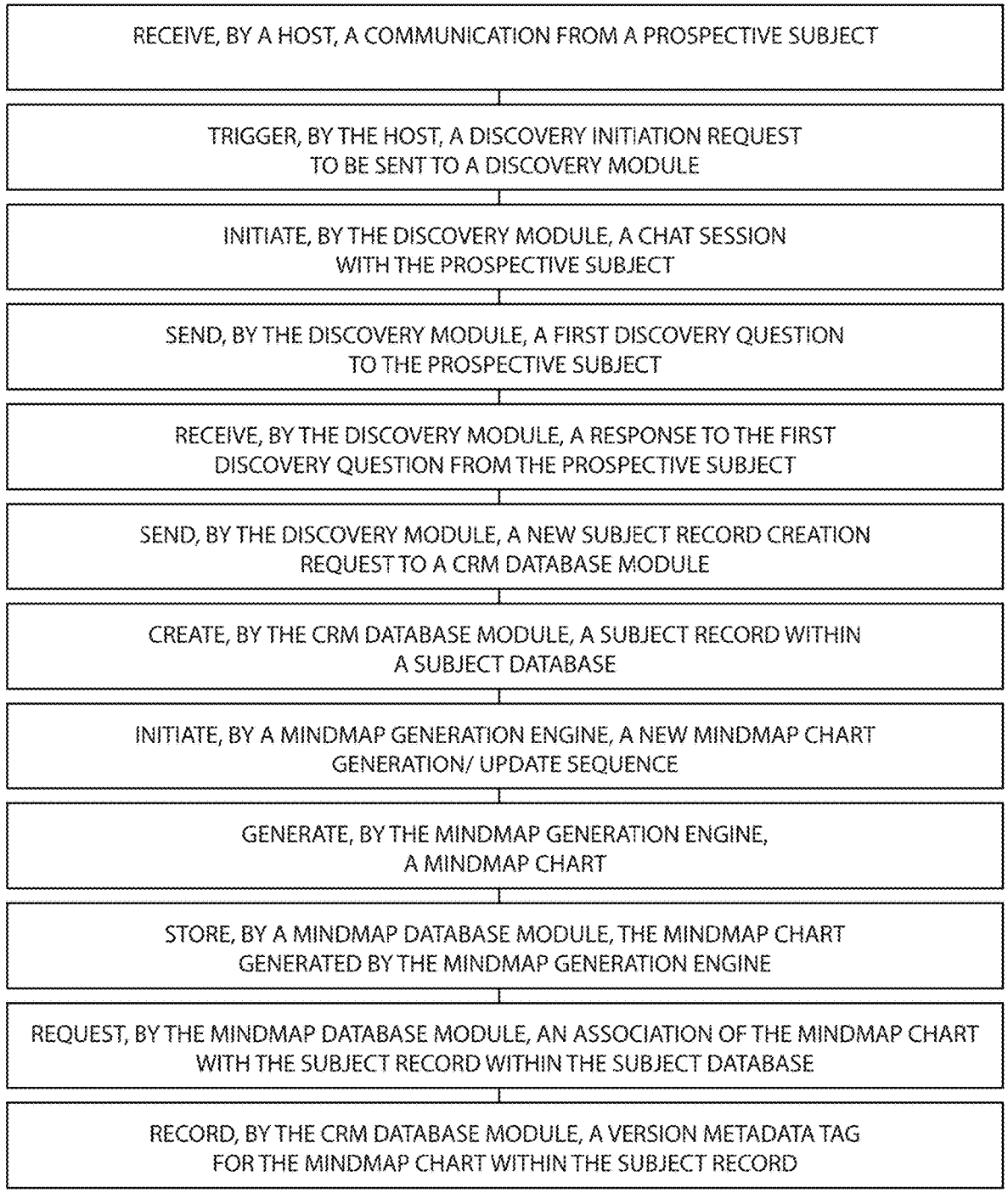
FIG. 4 is a flowchart of a method for initiating a discovery session, according to aspects of embodiments of the present disclosure.

FIG. 4 is a flowchart of a method for initiating a discovery session, according to aspects of embodiments of the present disclosure.

In some embodiments, the discovery session may include the steps of receiving, by a host, a communication from a prospective subject. In some embodiments, the communication may be received from an existing subject.

The discovery session may then, in some embodiments, proceed to triggering, by the host, a discovery initiation request to be sent to the discovery module.

In some embodiments, in response to the receipt of the discovery initiation request, the discovery session may include initiating, by the discovery module, a chat session with the prospective subject.

Then, in some embodiments, the discovery session may include sending, by the discovery module, a first discovery question to the prospective subject. In some embodiments, the discovery session may then include receiving, by the discovery module, a response to the first discovery question from the prospective subject.

In some embodiments, the discovery session may then include sending, by the discovery module, a new subject record creation request to the customer relations management database module. In some embodiments the customer relations management database module may include a relational database structure and be referred to as a "relational" database module.

In some embodiments, the discovery session may then include creating, by the customer relations management database module, a subject profile within the subject database. In some of those embodiments having a relational database structure, the subject profile may be referred to as a "subject record."

In some embodiments, the discovery session may then proceed to initiating, by a mindmap generation engine, a new mindmap chart generation/update sequence. Following the mindmap generation/update sequence, in some embodiments, a new mindmap chart for the subject may be generated.

In some embodiments, the discovery session may then include storing, by a mindmap database, the mindmap chart generated by the mindmap generation engine.

In some embodiments, the discovery session may then include requesting, by the mindmap database (module), an association of the mindmap chart with the subject profile within the subject database. In some embodiments, the subject profile may be a subject record.

In some embodiments, the discovery session may then include recording, by the customer relations database module, a version metadata tag for the mindmap chart within the subject profile.

In some embodiments, the process for conducting a discovery session may be referred to as a "discovery sequence."

D. Mindmap Chart Generation/Update Sequence

As discussed above, in some embodiments, the platform of the present disclosure may be directed to the generation and updating of mindmap charts. This process may, in some embodiments, be described as a mindmap chart generation/update sequence (also referred to as a "mindmap generation/update sequence"). Further understanding of the mindmap chart generation/update sequence may be had by reference to FIG. 5.

Figure 5:
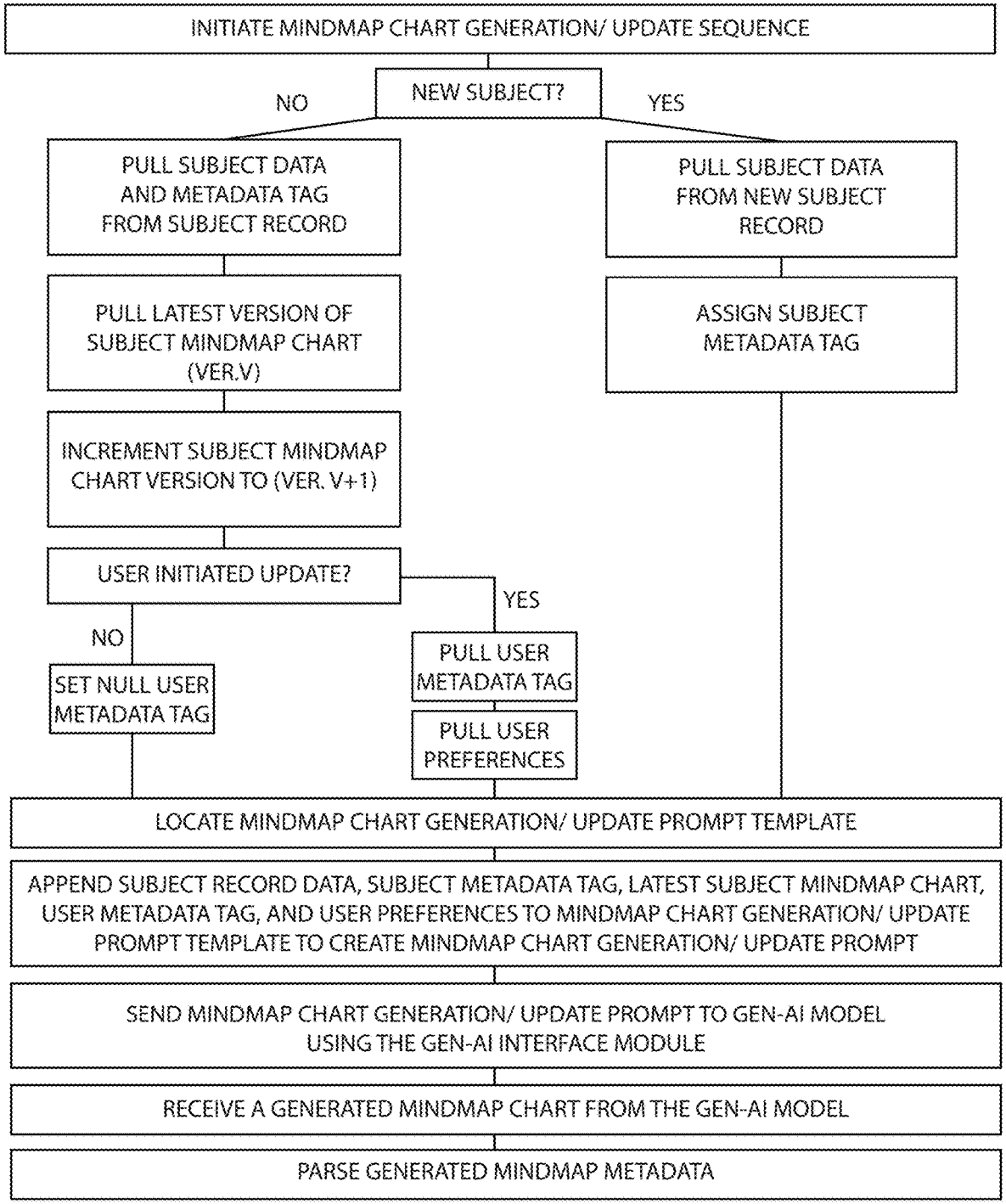
FIG. 5 is flowchart of a method for a mindmap generation/update sequence, according to aspects of embodiments of the present disclosure.

FIG. 5 is flowchart of a method for a mindmap generation/update sequence, according to aspects of embodiments of the present disclosure.

As shown in FIG. 5, in some embodiments the mindmap generation/update sequence may include initiating a mindmap generation/update sequence. Then, in some embodiments, the mindmap generation/update sequence will include a determination as to whether the sequence is directed to a new subject. If "NO," in some embodiments, the mindmap generation/update sequence will proceed to pulling subject data from a new subject record (also referred to as a "new subject record" for relational database embodiments) and assigning the subject metadata tag. If "YES," the mindmap generation/update sequence may, in some embodiments, proceed to the steps of pulling subject data and subject metadata tag from the subject profile (subject record), pulling the latest version of the subject mindmap (having a version tag value denoted as "v"), and incrementing the subject mindmap version metadata tag to a "v+1" value.

Then, in some embodiments, the mindmap generation/update sequence may also include determining if the sequence is for a user-initiated update. If "NO", then, in some embodiments, a null user metadata tag may be set. If "YES" then, in some embodiments, the mindmap generation/update sequence may include appending the user metadata tag and appending user preferences. In some embodiments, this may allow for the subsequently generated/updated mindmap chart to be associated with the use and customized according to the user preferences.

In some embodiments, the mindmap generation/update sequence may include locating a mindmap chart generation/update prompt template.

In some embodiments, the mindmap generation/update sequence may include appending subject record data, a subject metadata tag, the latest subject mindmap chart, a user metadata tag, and a user preferences to the mindmap chart generation/update prompt template to create mindmap chart generation/update prompt.

The mindmap generation/update sequence may then, in some embodiments, include sending the mindmap chart generation/update prompt to a gen-AI model using the generative artificial-intelligence interface module.

In some embodiments, the mindmap generation/update sequence may then include receiving a generated mindmap chart from the gen-AI model.

In some embodiments, the mindmap generation/update sequence may then include parsing any mindmap chart metadata associated with the generated mindmap chart.

E. Update Sequence

Figure 6:
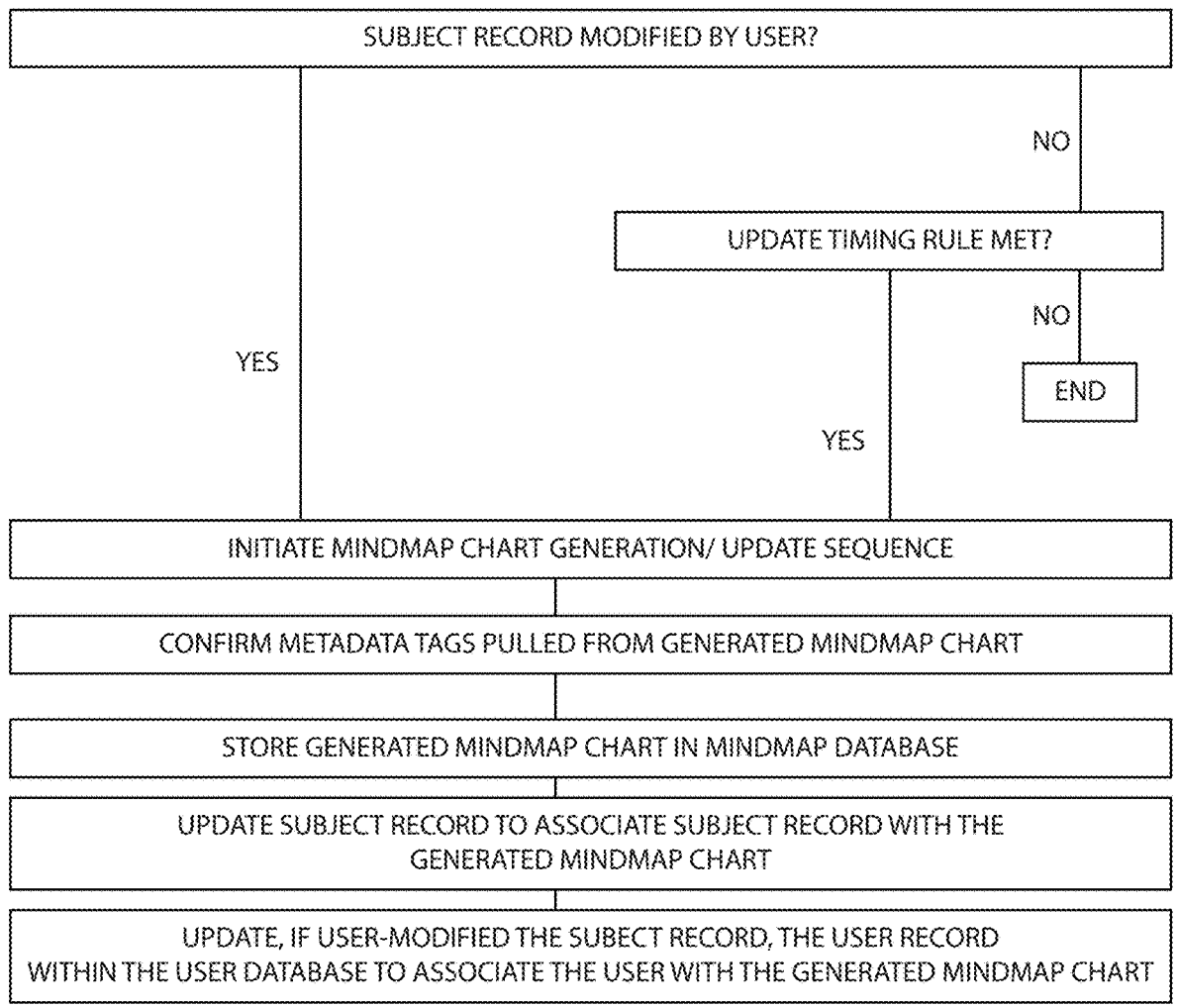
FIG. 6 is a flowchart of an update sequence, according to aspects of embodiments of the present disclosure.

Further understanding of some embodiments of the update sequence carried out by the updater module may be had by reference to FIG. 6.

FIG. 6 is a flowchart of an update sequence, according to aspects of embodiments of the present disclosure.

As shown in FIG. 6, in some embodiments, the update sequence may begin with a determination if the update sequence has been triggered in response to a subject profile (record) being modified by a user. If the update sequence was not triggered by such a modification, then, in some embodiments, the update sequence may include a determination if an update timing rule has been met. If "NO" then, in some embodiments, the update sequence may end (terminate). If "YES" then, in some embodiments, the update sequence may proceed to initiating a mindmap generation/update sequence.

Following the mindmap generation/update sequence, in some embodiments, the update sequence may then include confirming the metadata tags pulled from the generated mindmap chart, storing the generated mindmap chart in the mindmap database, updating the subject profile (record) associated with the generated mindmap chart, and updating—if a user modified the subject profile (record)—the user profile (record) within the user database.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claim. It should be noted that although examples of the invention are set forth herein, the claims, and the full scope of any equivalents, are what define the metes and bounds of the invention.

What is claimed is:

1. A generative artificial-intelligence augmented mindmap chart engine and customer relations management database platform, comprising:
 a customer relations management database module comprising:
  a user database configured to store one or more user profiles; and
  a subject database configured to store one or more subject profiles; and
 a mindmap generation engine comprising:
  a discovery module configured to initiate a discovery session and present one or more discovery questions, receive new subject data, and store subject data in one or more subject profiles;
  a generative artificial-intelligence interface module configured to communicate with one or more generative artificial intelligence models using one or more application programming interfaces;
  a retrieval-augmented generation database module configured to store one or more mindmap chart generation/update prompt templates and append subject data from the one or more subject profiles, user data from the one or more user profiles, and one or more mindmap charts to the one or more mindmap chart generation/update prompt template to create one or more mindmap chart generation/update prompts;
  a mindmap database configured to store the one or more mindmap charts and one or more metadata tags associated with the one or more mindmap charts; and
  an updater module configured to initiate a mindmap chart update sequence.

2. The generative artificial-intelligence augmented mindmap chart engine and customer relations management database platform of claim 1, wherein the user profiles are configured with a user metadata tag, the subject profiles are configured with a subject metadata tag, and the mindmap charts are configured with a mindmap chart metadata tag.

3. The generative artificial-intelligence augmented mindmap chart engine and customer relations management database platform of claim 1, wherein the discovery session is a conducted using an automated chatbot.

4. The generative artificial-intelligence augmented mindmap chart engine and customer relations management database platform of claim 1, wherein the generative artificial-intelligence model is an external large language model (LLM) generative AI platform.

5. The generative artificial-intelligence augmented mindmap chart engine and customer relations management database platform of claim 1, wherein the update sequence is initiated in response to a subject profile being updated by a user.

6. The generative artificial-intelligence augmented mindmap chart engine and customer relations management database platform of claim 1, wherein the updater module is configured to increment a mindmap chart version metadata tag in response to completing an update sequence.

7. A multi-user generative artificial-intelligence augmented mindmap chart engine and customer relations management database platform, comprising:
 a customer relations management database module comprising:
  a user database configured to store one or more user profiles, each user profile having a unique user metadata tag; and
  a subject database configured to store one or more subject profiles, each subject profile having a unique subject metadata tag; and
 a mindmap generation engine comprising:
  a discovery module configured to initiate a discovery session and present one or more discovery questions, receive new subject data, and store subject data in one or more subject profiles;
  a generative artificial-intelligence interface module configured to communicate with one or more generative artificial-intelligence models using one or more application programming interfaces;
  a retrieval-augmented generation database module configured to store one or more mindmap generation/update prompt templates and append subject data from the one or more subject profiles, user data from the one or more user profiles, and one or more mindmap charts to the one or more mindmap generation/update prompt template to create one or more mindmap chart generation/update prompts;
  a mindmap database configured to store the one or more mindmap charts, each mindmap chart having an associated mindmap chart version tag, and one or more mindmap chart metadata tags associated with the one or more mindmap charts; and an updater module configured to initiate mindmap chart update sequences.

8. The multi-user generative artificial-intelligence augmented mindmap chart engine and customer relations management database platform of claim 7, wherein the user database, the subject database, and the mindmap database comprise relational database structures.

9. The multi-user generative artificial-intelligence augmented mindmap chart engine and customer relations management database platform of claim 7, wherein at least one of the one or more generative artificial-intelligence models is an internal generative artificial-intelligence model integrated within the platform.

10. The multi-user generative artificial-intelligence augmented mindmap chart engine and customer relations management database platform of claim 7, wherein at least one of the one or more generative artificial-intelligence models is an external generative artificial-intelligence model hosted remotely.

11. The multi-user generative artificial-intelligence augmented mindmap chart engine and customer relations management database platform of claim 7, wherein the user data from the one or more user profiles includes a user preference that designates a prioritization for one or more categories of subject data to be displayed within a generated mindmap chart.

12. The multi-user generative artificial-intelligence augmented mindmap chart engine and customer relations management database platform of claim 7, wherein a mindmap chart generated by the platform includes the user metadata tag, the subject metadata tag, and the associated mindmap chart version tag.

13. The multi-user generative artificial-intelligence augmented mindmap chart engine and customer relations management database platform of claim 12, wherein the operator database module and the mindmap database are configured to associate the mindmap chart generated by the platform with user profile corresponding to the user metadata tag and the subject profile corresponding to the subject metadata tag.

14. A cloud-based multi-user generative artificial-intelligence augmented mindmap chart engine and customer relations management database platform, comprising:
a host comprising computer-readable instructions stored in a memory that, when executed by one or more processing units of one or more cloud servers, instantiate one or more software modules of the platform, the one or more modules of the platform comprising:
a customer relations management database module comprising:
a user database configured to store one or more user records; and
a subject database configured to store one or more subject records; and
a mindmap generation engine comprising:
a discovery module configured to initiate a discovery session and present one or more discovery questions, receive new subject data, and store subject data in one or more subject records;
a generative artificial-intelligence interface module configured to communicate with one or more generative artificial-intelligence models using one or more application programming interfaces;
a retrieval-augmented generation database module configured to store one or more mindmap generation/update prompt templates and append subject data from the one or more subject records, user data from the one or more user records, and one or more mindmap charts to the one or more mindmap generation/update prompt template to create one or more mindmap chart generation/update prompts;
a mindmap database configured to store the one or more mindmap charts and one or more metadata tags associated with the one or more mindmap charts; and
an updater module configured to initiate mindmap chart update sequences.

15. The cloud-based multi-user generative artificial-intelligence augmented mindmap chart engine and customer relations management database platform of claim 14, wherein the user database, the subject database, and the mindmap database comprise relational database structures.

16. The cloud-based multi-user generative artificial-intelligence augmented mindmap chart engine and customer relations management database platform of claim 14, wherein at least one of the one or more generative artificial-intelligence models is an external generative artificial-intelligence model hosted remotely.

17. The cloud-based multi-user generative artificial-intelligence augmented mindmap chart engine and customer relations management database platform of claim 14, wherein the user data from the one or more user profiles includes a user preference that designates a prioritization for one or more categories of subject data to be displayed within a generated mindmap chart.

18. The cloud-based multi-user generative artificial-intelligence augmented mindmap chart engine and customer relations management database platform of claim 17, wherein the user data from the one or more user profiles is for each user profile whereby each user profile when associated with a mindmap chart generation/update request will generate a mindmap chart specific to the user preferences included in the associated user profile.

19. The cloud-based multi-user generative artificial-intelligence augmented mindmap chart engine and customer relations management database platform of claim 18, wherein each mindmap chart generated by the platform has an associated mindmap chart version tag.

20. The cloud-based multi-user generative artificial-intelligence augmented mindmap chart engine and customer relations management database platform of claim 19, wherein the mindmap database is configured to allow for tracking the changes over time made to mindmap charts stored in the mindmap database according to the mindmap chart version tag.

* * * * *